United States Patent

Beretta

[11] Patent Number: 5,901,243
[45] Date of Patent: May 4, 1999

[54] DYNAMIC EXPOSURE CONTROL IN SINGLE-SCAN DIGITAL INPUT DEVICES

[75] Inventor: Giordano B. Beretta, Palo Alto, Calif.

[73] Assignee: Hewlett-Packard Company, Palo Alto, Calif.

[21] Appl. No.: 08/724,711

[22] Filed: Sep. 30, 1996

[51] Int. Cl.⁶ ................................... G06T 5/00
[52] U.S. Cl. .................. 382/168; 358/458; 358/461; 358/522; 382/167
[58] Field of Search .................. 382/167, 168, 382/169; 358/461, 518, 522, 458

[56] References Cited

U.S. PATENT DOCUMENTS

| | | | |
|---|---|---|---|
| 4,642,683 | 2/1987 | Alkofer | 358/522 |
| 4,729,016 | 3/1988 | Alkofer | 358/522 |
| 4,805,218 | 2/1989 | Bamberg | 704/241 |
| 4,942,473 | 7/1990 | Zeevi | 348/281 |
| 4,947,445 | 8/1990 | Sakamoto | 382/50 |
| 5,028,784 | 7/1991 | Arakawa | 250/584 |
| 5,046,118 | 9/1991 | Ajwole | 382/169 |
| 5,077,605 | 12/1991 | Ikeda et al. | 358/75 |
| 5,101,284 | 3/1992 | Tanabe | 358/461 |
| 5,115,189 | 5/1992 | Holcomb | 324/121 R |
| 5,130,788 | 7/1992 | Hirota | 358/75 |
| 5,150,223 | 9/1992 | Telle | 358/448 |
| 5,200,840 | 4/1993 | Koike | 358/451 |
| 5,210,600 | 5/1993 | Hirata | 358/76 |
| 5,214,520 | 5/1993 | Miyazawa | 358/461 |
| 5,237,431 | 8/1993 | Imoto | 358/445 |
| 5,265,200 | 11/1993 | Edgar | 395/131 |
| 5,297,221 | 3/1994 | Masuda et al. | 382/50 |
| 5,317,421 | 5/1994 | Ito | 358/464 |
| 5,347,370 | 9/1994 | Ishihara et al. | 358/461 |
| 5,347,374 | 9/1994 | Fuss et al. | 358/522 |
| 5,412,489 | 5/1995 | Hirota | 358/461 |
| 5,414,538 | 5/1995 | Eschbach | 358/522 |
| 5,422,740 | 6/1995 | Fujimoto et al. | 358/521 |
| 5,430,559 | 7/1995 | Hirota | 358/516 |
| 5,696,595 | 12/1997 | Yamanishi | 358/298 |

FOREIGN PATENT DOCUMENTS

| | | | |
|---|---|---|---|
| 561287A2 | 3/1992 | European Pat. Off. | H04N 1/40 |
| 572325A1 | 5/1993 | European Pat. Off. | H04N 1/40 |

OTHER PUBLICATIONS

Isao Furukawa, Kazunobu Kashiwabuchi, Sadayasu Ono, "Super High Defition Image Digitizing System", IEEE, 1992, pp. III/529–III–532.

Primary Examiner—Edward L. Coles
Assistant Examiner—David J. Rosenblum

[57] ABSTRACT

In the present invention statistical methods are used to estimate the reflectance of the paper and align the tone gamut to the dynamic range of a digital input device such as a scanner during a single scan. The estimate is refined during the scan. This refinement increases the robustness with respect to unfavorable originals (e.g., originals with a dark border) and at the same time also can take into account such phenomena as the change of the response of the sensor due to thermal effect during slow scans. In the present invention no spatial information on the image is collected. Instead a histogram of the occurrence of each tone level is accumulated during the scan. The background color of the image, i.e., the tone value of the paper is estimated by analyzing the histogram. When this value is known, the parameters for a tone reproduction curve (TRC) can be calculated. The shape of the TRC is not altered by these parameters, i.e., the exposure can be controlled independently of the tone reproduction. This process is repeated from time to time during the scan to assure robustness and to compensate for drifts in the sensitivity of the sensor.

16 Claims, 7 Drawing Sheets

DYNAMIC EXPOSURE CONTROL IN SINGLE-SCAN DIGITAL INPUT DEVICES

BACKGROUND OF THE INVENTION

1. Field of the Invention

The present invention relates to digital input devices and, more particularly, to the control of exposure therein.

2. Description of the Related Art

Although the light source in a digital input device such as a scanner is more or less constant, papers reflect light to a varying degree. L* is a colorimetric quantity that correlates well with the perceived lightness of a paper. This measure is scaled so that the perfect reflecting diffuser has value 100; one unit corresponds to a just noticeable difference (jnd). The table below shows the L* values for some typical papers:

| Medium | L* |
|---|---|
| perfect reflecting diffuser | 100 |
| premium paper | 97 |
| recycled copier paper | 95 |
| photographic AgX paper | 93 |
| European recycled paper | 87 |

The table indicates that the perceived lightness difference of typical papers spans a range of 10 jnd units. In a linear intensity space where sensors operate, such as the reflectance Y, the range is from 94 for the premium paper to 71 for the European recycled paper.

The range of values present in the original image or document can be called the tone gamut. Typically the lowest value in the gamut corresponds to black ink and the highest value corresponds to the paper background. The range of values for which a unique signal is generated by the lamp and sensor system in a scanner can be called its dynamic range.

A system is usually designed so that its dynamic range contains an original with the darkest ink on the lightest paper. Because of fluorescent substances often used in paper, the lightest value can be larger than the value of the perfect reflecting diffuser. This dynamic range can be called the worst case.

When the image is output on a display monitor or a printer, this device will also be calibrated to the worst case, i.e., the lightest possible value will be used to represent the worst case lightest pixels. In a system that reproduces lightness relative to the perfect reflective diffuser, an image scanned from a dark background such as a photograph will be reproduced by using ink to make the background darker (or the signal to a display monitor will be reduced) because the value without ink (or full display monitor signal) will be reserved to the worst case.

The human visual system (HVS) already adjusts for the background or surround. This is why lightness (i.e., brightness relative to an area perceived to be white) is a more important perceptual attribute than brightness for a gray-scale and color reproduction. If a reproduction system does not map the input paper lightness into the output paper lightness, the appearance of the facsimile will be judged as inferior (e.g., smudgy) by a human observer.

In the patent literature the adjustment for different papers, or more generally backgrounds, is sometimes called shading correction and is sometimes called exposure enhancement. This should not be confused with a compensation for sensor artifacts such as photo response non-uniformity (PRNU) and dark current, which in the literature is called normalization.

Figure 1:
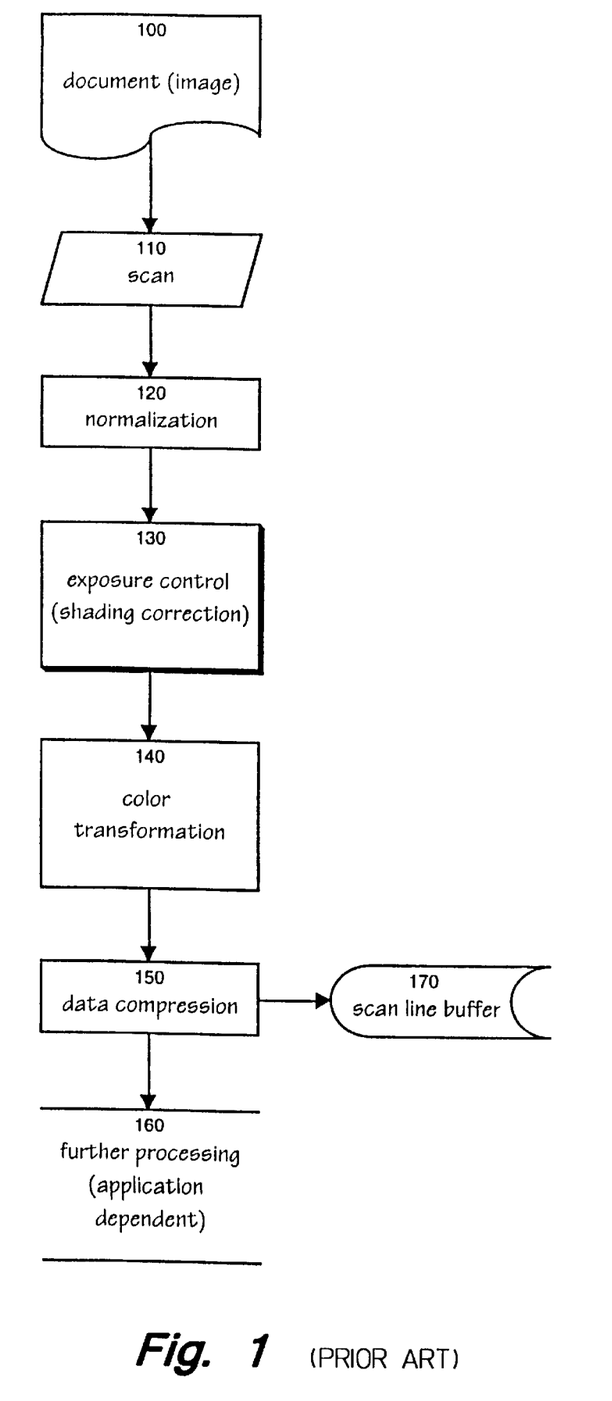
FIG. 1 is a flow chart illustrating a prior art method of processing a scan line.

FIG. 1 is a flow chart illustrating a prior art method of processing a scan line. A document (100) containing an image is scanned (110) and then normalized (120). Exposure control (shading correction) is then performed (130) prior to color transformation (140) and data compression (150). The resulting information is then sent to the scan line buffer 170 or further application dependent processing is performed (160).

The standard solution adopted in many desktop scanner applications and digital copiers is to perform a first preview scan at a low resolution. The so obtained image is analyzed to determine the paper color of the original (or background value) and other parameters. The values so obtained are then used to set the scanner controls, after which the final scan is performed.

In applications such as sheet-fed scanners and color facsimile, it is not possible to perform such a preview scan. In particular, in the case of a color facsimile machine, the image is transmitted during the scan and concomitantly printed on a remote machine, precluding any form of post-processing.

A solution sometimes used is to assume a worst case or a typical case. If the assumption errs towards a high lightness, the scanned image will not have a white background, yielding a smudgy appearance, decreasing the performance of image compression algorithms, and consuming more ink or toner when the image is printed. If the assumption errs towards a low lightness, detail will be lost in the highlights of the image, yielding a washed out appearance.

Manufacturers of digital copiers and color facsimile machines have encountered this problem and developed various approaches. Previous attempts to solve this problem are mostly ad hoc. The disadvantages of methods obtained by trial and error are that they are not robust and cannot easily be adapted when the technology improves non-linearly.

Thus, it can be seen that single-scan constraints impose exposure control limits upon current technology digital input devices and hinder the use of these devices in many applications.

Therefore, there is an unresolved need for an exposure control mechanism that will significantly improve alignment of tone gamut to the dynamic range of a single-scan digital input device while compensating for such phenomena as the change of the response of the sensor due to thermal effect during slow scans.

SUMMARY OF THE INVENTION

In the present invention statistical methods are used to estimate the reflectance of the paper and align the tone gamut to the dynamic range of a digital input device such as a scanner during a single scan. The estimate is refined during the scan. This refinement increases the robustness with respect to unfavorable originals (e.g., originals with a dark border) and at the same time also can take into account such phenomena as the change of the response of the sensor due to thermal effect during slow scans.

In the present invention no spatial information on the image is collected. Instead a histogram of the occurrence of each tone level is accumulated during the scan. The background color of the image, i.e., the tone value of the paper is estimated by analyzing the histogram. When this value is known, the parameters for a tone reproduction curve (TRC)

can be calculated. The shape of the TRC is not altered by these parameters, i.e., the exposure can be controlled independently of the tone reproduction. This process is repeated from time to time during the scan to assure robustness and to compensate for drifts in the sensitivity of the sensor.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 2–11. Those skilled in the art will readily appreciate that the detailed description given herein with respect to these figures is for explanatory purposes, however, because the invention extends beyond these limited embodiments.

Figure 2:
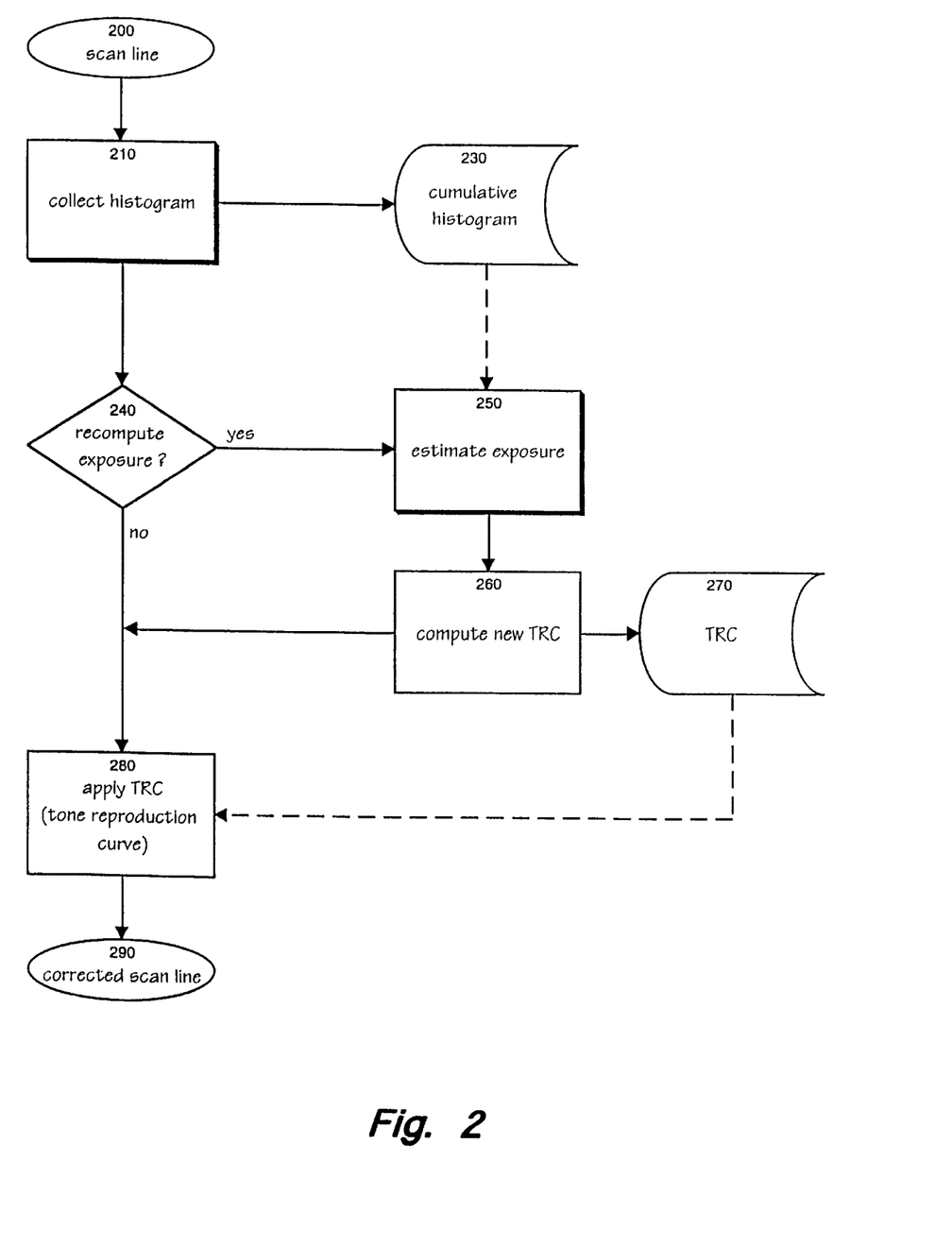
FIG. 2 is a flow chart illustrating shading correction exposure control practiced according to one embodiment of the present invention.

FIG. 2 is a flow chart illustrating shading correction exposure control practiced according to one embodiment of the present invention. A line is scanned (200). A histogram is then collected (210) for the scanned line and this information is used to update a cumulative histogram 230. Test 240 is then made to determine whether the exposure should be recomputed. If so, then cumulative histogram 230 is used to estimate exposure (250) and a new TRC (tone response curve) 270 is computed (260). TRC 270 is then applied (280) yielding corrected scan line 290. If, on the other hand, it is determined in test 240 that exposure for this scan line is not to be recomputed, then TRC 270 is simply applied (280) to yield corrected scan line 290.

Figure 3:
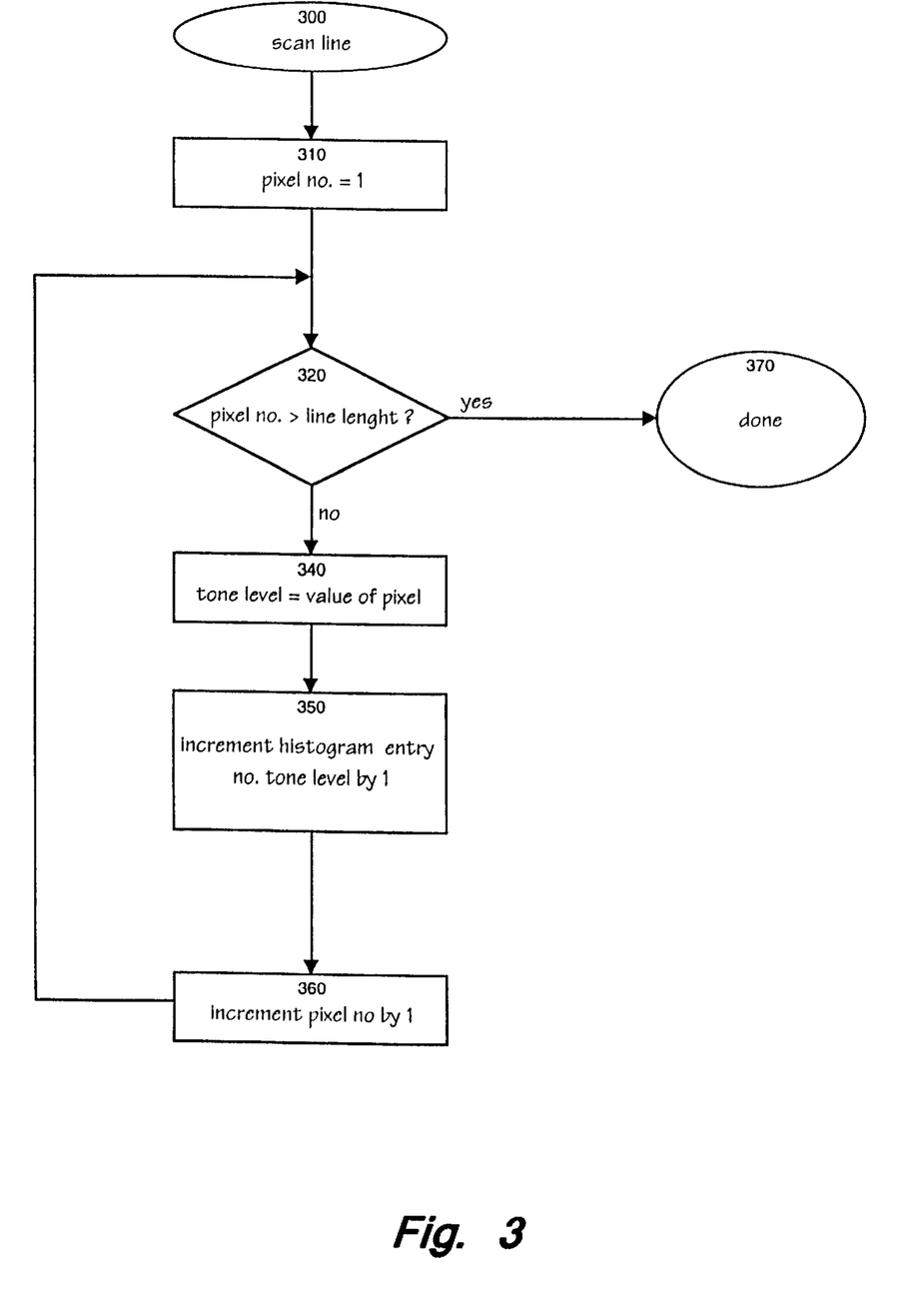
FIG. 3 is a flow chart illustrating histogram collection practiced according to one embodiment of the present invention.

FIG. 3 is a flow chart illustrating histogram collection practiced according to one embodiment of the present invention. A line is scanned (300) and a pixel counter is set to one (310). Test 320 then determines whether the end of the scan line has been reached, i.e., whether the pixel counter has exceeded the line length. If the end of the scan line has not been reached, then the tone level is set to the scanned value of the pixel (340). The histogram entry for the tone level of the pixel is incremented (350) and the pixel counter is incremented (360). This process is repeated until test 320 indicates the end of the scan line has been reached, at which time the histogram collection for the scan line ends (370).

Figure 4:
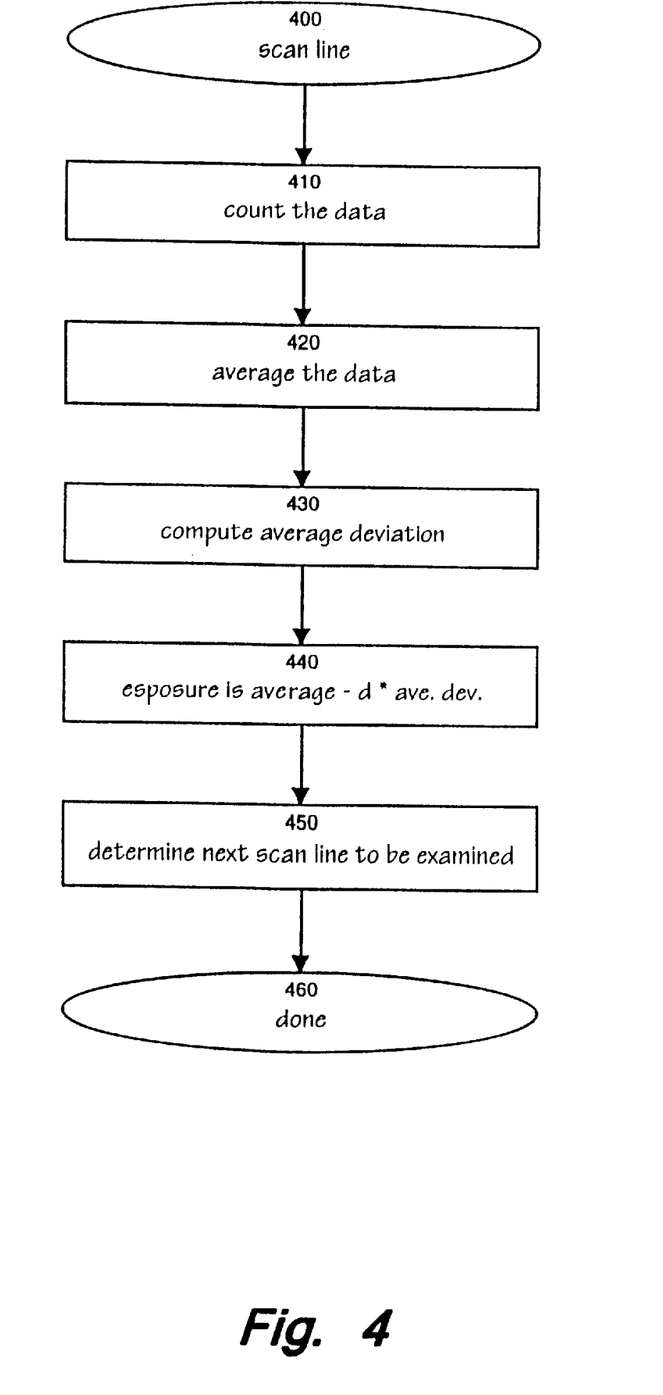
FIG. 4 is a flow chart illustrating exposure estimation practiced according to one embodiment of the present invention.

FIG. 4 is a flow chart illustrating exposure estimation practiced according to one embodiment of the present invention. The line is scanned (400) and data associated with the scanned line is counted (410). The data is then averaged (420) and the average deviation is computed (430). The exposure can then be calculated (440) as being the average minus d times the average deviation. The next scan line is then determined (450) prior to completion (460).

Figure 5:
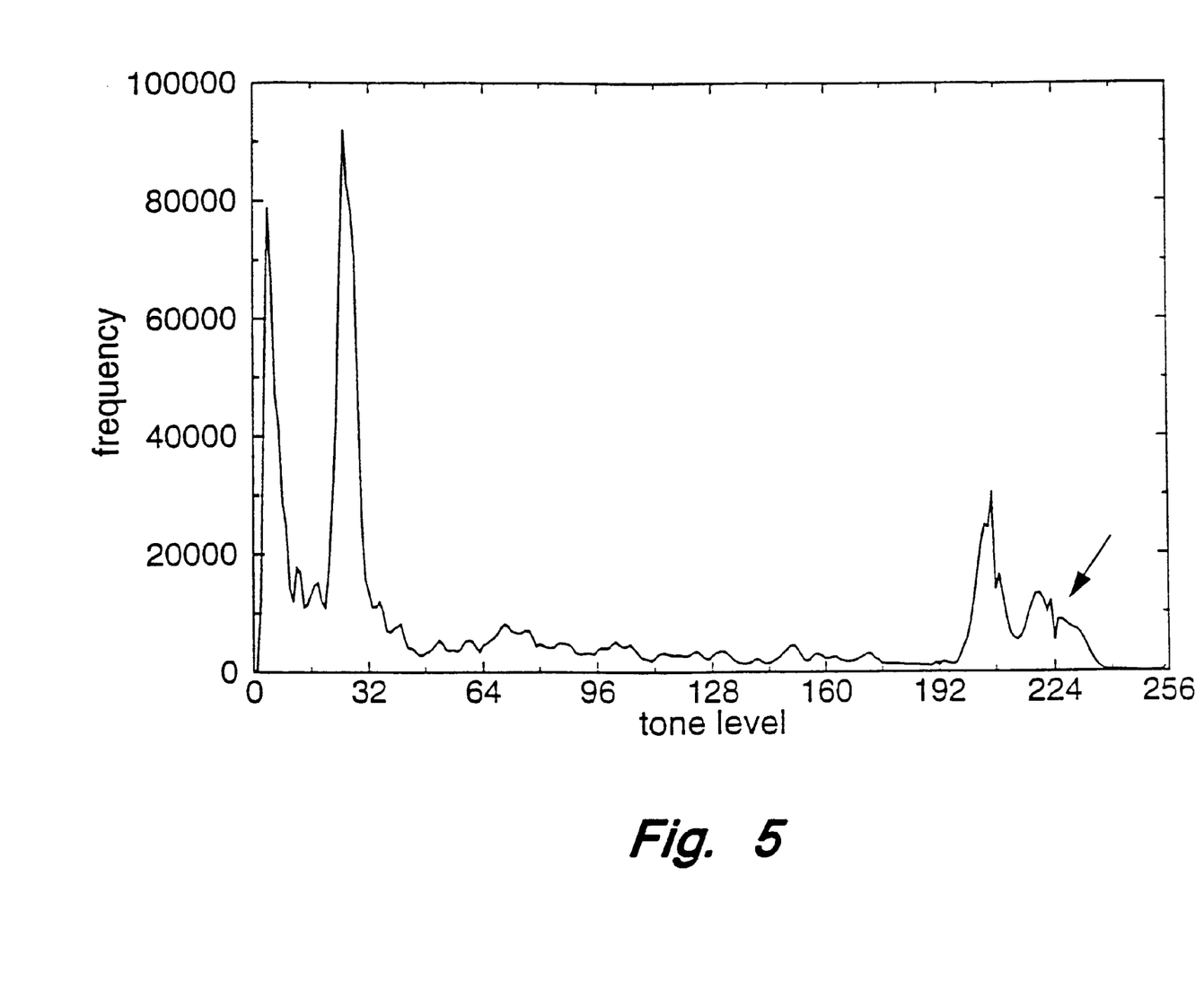
FIG. 5 illustrates a red color histogram of a color photograph collected according to one embodiment of the present invention.

FIG. 5 illustrates a red color histogram of a color photograph collected according to one embodiment of the present invention. More precisely, a photographic color print is scanned and for each level in the 8-bit red channel the number of pixels (frequency) with that tone level is counted. A low tone level value indicates a dark tone and a high tone level value indicates a light tone.

In the dark region of the histogram, the first peak corresponds to black pixels such as those pixels in text and the second peak corresponds to shadows. In the light region, the left peak corresponds to the highlights and the right peak corresponds to the paper background. The approach taken is to estimate the tone level for which the peak for the paper occurs. The exposure control or shading control consists of building a tone reproduction curve that maps this peak tone level into the value 255 representing white. This procedure aligns the tone gamut of the image with the dynamic range of the scanner, so that a predictable and distinct signal is generated for each tone level.

The arrow in the preceding figure indicates a common problem that occurs in the analog to digital conversion, namely a binning error. The device converts the tone level of the photosites with this same reflectance and a higher probability into the value 223 than into the value 224. Because of this non-monotonicity, the peak cannot be found with local methods, i.e., by scanning the histogram from right to left until a maximum is reached. The binning errors can be so severe that smoothing the data with various methods such as moving window averages or applying least-squares fits (Savitzky-Golay smoothing filters) does not allow for robust estimations.

Figure 6:
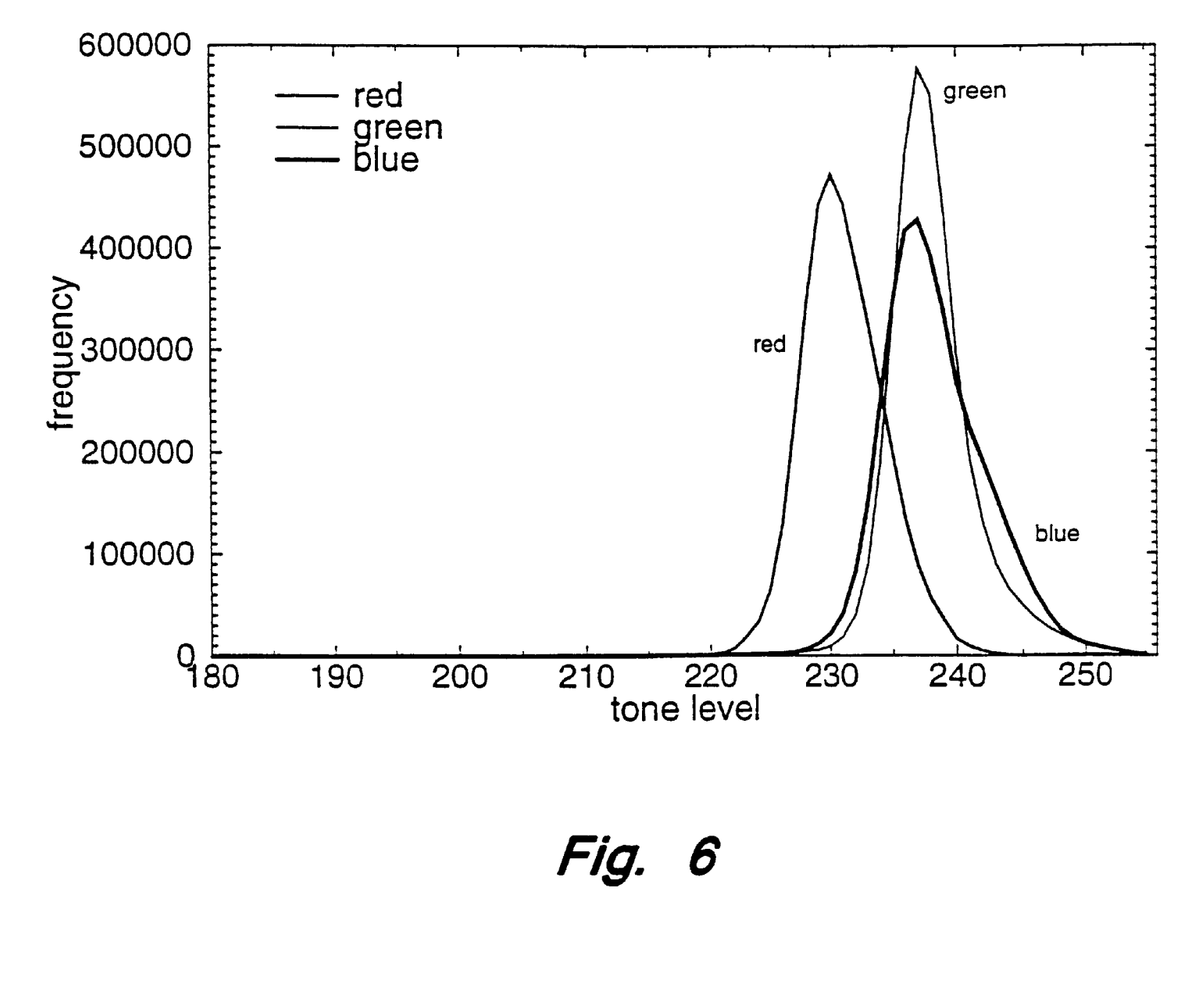
FIG. 6 illustrates the light end of the histogram for a blank sheet of premium ink jet paper collected according to one embodiment of the present invention.

The light portions of a number of images can be statistically examined by computing their central moments. FIG. 6 illustrates the light end of the histogram for a blank sheet of premium ink jet paper collected according to one embodiment of the present invention. This paper is characteristic in that it contains fluorescent substances that interact with peaks from the fluorescent light source used in some scanners. This produces a greater response in the green channel and a reduced response in the red channel. For this reason one can limit the method to examining the red channel, because a tone map that maps the red peak into 255 will also map the green and blue peaks to that value.

Notice that if one carefully selects the lower boundary for the light portion of the histogram, the curves are relatively symmetric. The mean estimates the value around which central clustering occurs. Strictly, this is true only for normal distributions, but due to the binning error problem, the mean is a more robust estimator than the mode or the median. One can make an allowance for the non-normal distribution by using the maximum likelihood estimator.

As FIG. 6 suggests, one should estimate not only location of the peak, but also the variability of the data around the expected value to obtain a full shading correction. In practice, the third (skewness) and fourth (kurtosis) central moments vary widely from sample to sample. Therefore the variance (or the standard deviation) is not a good estimator for this variability.

The average deviation or mean absolute deviation provides for a more robust estimation for the variability in the data. Also in this case one can use the maximum likelihood estimator to allow for the non-normality of the distribution.

In summary, one can determine the shading correction by accumulating histogram data on the tone levels in the red channel and then estimating the tone level of the paper by adding d average deviations to the mean value (to avoid background noise). For one embodiment, d=2 is a good choice, but analysis of a large number of different images might suggest a different value. Estimating the tone level of the paper means that this method is independent of the image and the particular artistic use of the tone range used to express it.

Two issues still remain to be discussed: when the analysis occurs and how the tome map is created.

Updating the histogram for each scan line is computationally inexpensive and is a feasible solution. The background color may change rapidly at the beginning due to paper skew and possible margins or rules in the original artwork. However, during most of the scan, the tone level of the paper will not change much and it is aesthetically undesirable to change the tone reproduction curve too harshly. From a statistical point of view, it is superfluous to examine every pixel to determine the tone level of the paper because an image does not consist of random pixels.

For many cases it is possible to use a simple scheme, such as "examine each pixel in the first 20 scan lines and then examine the histogram every 100 lines". However, such a simple method is not robust. Assume for instance that the scanned original is a ruled paper with a rule spacing corresponding to 50 scan lines. If the paper is aligned unfavorably, it may well be that the samples are taken exactly at the photosites corresponding to the rules, resulting to an incorrect exposure.

Due to the thermal effects mentioned earlier, the average deviation increases as one scans down the page, so that the histograms are not identically distributed across scan lines. This is especially the case in an application such as color facsimile where the scanning speed is bounded by the communication line speed.

At first this increasing average deviation might seem a problem, however, this is not so. In the first place, as mentioned earlier, d average deviations are added to the mean, thus the maximum is "pushed out" of the dynamic range to avoid background.

Furthermore, only the light portion of the histogram is examined to avoid failure in the case of originals with a border or other artistic uses of the tone range in the image or document.

Moreover, one can assume that a picture or graphic will never bleed out of the image edge. This is a reasonable assumption because the statistics are computed on the cumulative histogram and only the light portion is examined.

One can also assume the background is not a gradient with increasing darkness. In the rare case of an original having a gradient with increasing darkness, a manual override button on the machine can be employed to revert to a conventional approach. Alternately, the original can simply be rotated 180 degrees so that the background will have a gradient with decreasing darkness and then scanned or re-scanned.

Thus, for simplification one can assume that the statistical properties of the variation in the lightness of the background are nearly constant along a scan. Consequently, one can view the variation in the lightness of the background as a stationary stochastic process.

In this usage, stationary means that the probabilistic structure of different portions of the scanned document is the same. Thus, the probability distribution of the reflectance of the background is the same at all of the scan lines and the joint distribution of the reflectance of the background for pairs of scan lines distance h apart is always the same, and so forth. For more details regarding a stationary stochastic process, see for instance, "D. R. Cox and H. D. Miller: The Theory of Stochastic Processes, Chapman and Hall, London, 1965".

This is an adequate approximation for the simple purpose of just determining which particular scan lines to use to re-evaluate the exposure (i.e., the tone level of the paper).

Because the process is stationary, the arrival times are exponentially distributed. Drawing on the previously mentioned experience (i.e., feeding paper skewness and slip) adequate results were achieved for one embodiment, wherein the parameter of the exponential distribution was set to 2 for the first 20 scan lines and the parameter of the subsequent scan lines was set to 50. Of course, for alternate embodiments, other parameters can be used.

A program to generate the pseudo-random numbers required for this approach is easy to implement. The general methods are discussed in detail in "Donald E. Knuth: The Art of Computer Programming, Vol. 2/Seminumerical Algorithms, Addison-Wesley, Menlo Park, 1969". Robustness is discussed in "Giordano Beretta: Ein guter Zuflllszahlengenerator, Output, 1111, Goldach (Switzerland), 1978". A simple but reliable procedure can also be found in "William H. Press et al., Numerical Recipes in C, The Art of Scientific Computing, 2nd edition, Cambridge University Press, 1992".

For one approach, a table is created mapping each possible random number generated to a particular scan line to be evaluated. A sequence of random numbers is then generated and the associated scan lines are evaluated. For example, the seed number for a sequence can be chosen by ballot from the tables in "The Rand Corporation, A Million Digits with 100,000 Normal Deviates, Free Press, Glencoe, 1955".

A different pseudo-random number generator for exponentially distributed numbers could have been used and a different seed number could have been used. Each would produce a different but statistically equivalent set.

It is important to notice that for one embodiment the generated table is fixed and each page will reset the index to the first element. This will ensure that when a page is re-scanned, the result will be the same if the page location in the mechanism is the same.

For the statistical theory to be correct in this application, one only need generate a single table. Typically one would only want to estimate the correct exposure for each individual page. Alternately, one could generate a new table for each scan, for example, to compute some statistic across pages.

As stated at the beginning, the aim of the dynamic exposure control mechanism is to align the gamut of the original image with the dynamic range of the scanner system. The appearance of an image depends upon the shape of the tone reproduction curve (TRC). Our method allows one to set the parameters for a "good" TRC.

There are many tone reproduction curve designs suitable for use with the present approach. FIGS. 7–11 illustrate TRCs suitable for use within an embodiment of the present invention. Many TRC design methods have been described in the literature since Leonardo da Vinci's Chiaroscuro. The following is a brief discussion of some practical considerations associated with selection of a TRC.

Because tone reproduction refers to the appearance of images, tone reproduction curves are discussed in a perceptually linear space rather than in a space that is linear in intensity. Examples of spaces that are linear in intensity are the red, green and blue channels of scanners and display monitors. Examples of approximately perceptual linear spaces are optical density and L*.

Figure 7:
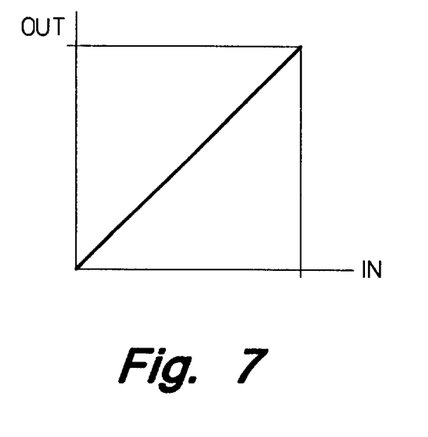
FIG. 7 illustrates an identity tone map suitable for use within one embodiment of the present invention.
Figure 8:
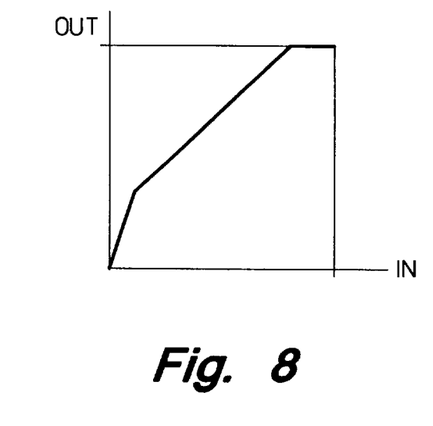
FIG. 8 illustrates an identity tone map suitable for use within one embodiment of the present invention.

FIG. 7 shows the identity tone map, where the tone levels are left unchanged. FIG. 8 shows a tone correction by offset wherein a fixed value is added to the tone levels so that all levels higher than the exposure level (i.e., the level of the background) are mapped into the maximum value. The slope of the curve is unchanged signifying that the macro contrast or apparent contrast of the image is not changed. To keep the black portion of the image (e.g., the text in a document) black, a knee has to be introduced at a threshold value so that the darkest portion of the image remains dark.

The disadvantage of such a curve of FIG. 8 is that the dark portions of the image have a lower contrast, so that they are overemphasized with respect to the remainder of the image, yielding the appearance, in a printed hardcopy, of a poor ink coverage.

Figure 9:
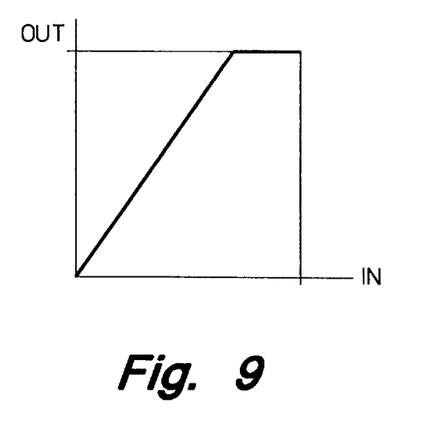
FIG. 9 illustrates a gain tone map suitable for use within one embodiment of the present invention.

This problem can be solved by using a gain instead of an offset to "push" the background level outside the dynamic range, as is shown in FIG. 9. At first this method might seem objectionable, because the apparent contrast of the image is altered. However, in practice this method yields acceptable results because the increased contrast compensates for the contrast reduction caused by flare in the scanner, printer and/or display monitor.

Figure 10:
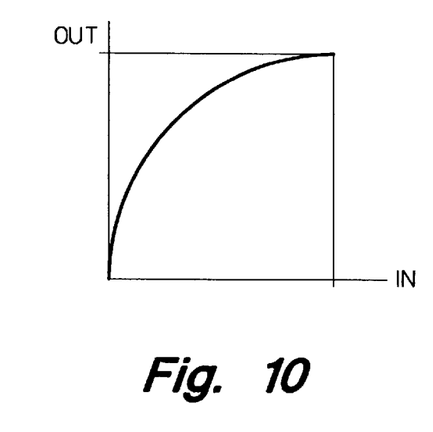
FIG. 10 illustrates an exponential tone map suitable for use within one embodiment of the present invention.

FIG. 10 shows Eschbach's method, in which an exponential correction is applied. Although the appearance of the image is improved over the use of the TRC of FIG. 7, this TRC has the objectional property that the linear proportion of the tone values in the image are destroyed, thus altering the expression of the image.

Bartleson and Breneman of Eastman Kodak Company have conducted extensive studies on the apparent contrast in black and white reproductions. An extensive overview of the subject can be found in chapter 5 "Tone Reproduction and Color Balance" in J. A. C. Yule: Principles of Color Reproduction, Wiley and Sons, New York, 1967" and a more recent account appears in R. W. G. Hunt: The Reproduction of Colour in Photography, Printing and Television, 4th edition, Fountain Press, Tolworth, 1987".

Figure 11:
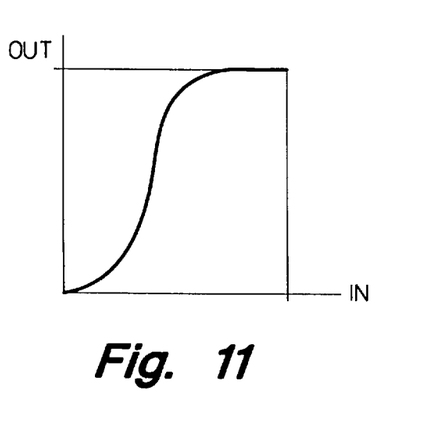
FIG. 11 illustrates a sigmoidal tone map suitable for use within one embodiment of the present invention.

In essence, the TRC is separated into three regions. They are called toe, corresponding to dark values, the shoulder, corresponding to light values, and the mid-tones, where most of the pictorial information in an image tends to reside. FIG. 11 shows a typical sigmoidal TRC. The sigmoidal shape has the following properties.

First, the toe is designed to cover the shadow portion of the image. The low slope keeps dark colors dark. For example, this ensures that the black text in documents stays black and can be easily processed, for example, by an optical character recognition (OCR) stage in the receiving system because the edges remain sharper.

Second, the mid-tone region is kept straight, so that the reproduction of these important tone values is linear. The slope of the curve is called gamma, not to be confused with the gamma used to designate the exponent in an exponential TRC. The value of gamma is chosen so that it compensates for the flare in the system and for the apparent contrast reduction induced by the viewing conditions.

Third, the shoulder tapers off so that the variability in the tone level of the background can be controlled while some detail can be preserved in the highlights of the image.

The dynamic exposure control method decouples the design of the TRC from the actual data representing an image. The analysis on the data is used to determine the parameters for a TRC designed for optimal system performance. Examples of the parameters are the position and curvature of the toe and shoulders of the TRC.

To ensure that the parameters change only slowly during the scan, each time the parameters are changed, the new refined values based upon the larger portion of the image are averaged with the previous parameter values. This increases the robustness of the method.

The statistical approach has the advantage that instead of examining the signals pertinent to an image, statistical methods are used to estimate the tone level of the paper or other background that constitutes the substrate carrying an image or document. This decouples the tone reproduction characteristic from the exposure control necessary to map the tone range of the image into the dynamic range of the scanner designed for a worst case situation.

The statistical method is incremental because the statistical data is gathered during the scan. While the scan progresses, the estimate is refined based upon the increased amount of data available from the accumulated histogram.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An exposure control method for a digital input device, comprising the steps of:

collecting a histogram for a scanned line on a medium;

updating a cumulative histogram based upon the histogram collected for the scanned line; and     using the histogram collected for the scanned line to estimate the reflectance of the medium;

wherein the histogram collected for the scanned line is used to estimate the reflectance of the medium indirectly by revising an estimation based upon the updated cumulative histogram and thereby align an estimated tone gamut of the medium to the dynamic range of the digital input device to generate a tone response curve during a single scan; and     wherein the step of estimating the reflectance of the medium includes determining an average tone value within the cumulative histogram and determining an average tone deviation value within the cumulative histogram.

2. The method as set forth in 1, wherein the step of estimating the reflectance of the medium is performed for predetermined scanned lines.

3. The method as set forth in 1, wherein the step of estimating the reflectance of the medium is performed for randomly determined scanned lines.

4. An exposure control method for a digital input device, comprising the steps of:

collecting a histogram for a scanned line on a medium;

updating a cumulative histogram based upon the histogram collected for the scanned line;

using the histogram collected for the scanned line to estimate the reflectance of the medium; and wherein the histogram collected for the scanned line is used to estimate the reflectance of the medium indirectly by revising an estimation based upon the updated cumulative histogram and thereby align an estimated tone gamut of the medium to the dynamic range of the digital input device to generate a tone response curve during a single scan; and wherein the step of estimating the reflectance of the medium includes determining an average tone value for a particular color channel within the cumulative histogram.

5. The method as set forth in 4, wherein the step of estimating the reflectance of the medium includes determining an average tone deviation value for a particular color channel within the cumulative histogram.

6. The method as set forth in 4, wherein the particular color is red.

7. The method as set forth in 4, wherein the step of estimating the reflectance of the medium is performed for predetermined scanned lines.

8. The method as set forth in 4, wherein the step of estimating the reflectance of the medium is performed for randomly determined scanned lines.

9. An exposure control apparatus for a digital input device, the apparatus comprising:

means for collecting a histogram for a scanned line on a medium;

means for updating a cumulative histogram based upon the histogram collected for the scanned line; and means for using the histogram collected for the scanned line to estimate the reflectance of the medium;

wherein the histogram collected for the scanned line is used to estimate the reflectance of the medium indirectly by revising an estimation based upon the updated cumulative histogram and thereby align an estimated tone gamut of the medium to the dynamic range of the digital input device to generate a tone response curve during a single scan; and wherein the estimation of the reflectance of the medium includes determining an average tone value within the cumulative histogram and determining an average tone deviation value within the cumulative histogram.

10. The apparatus as set forth in 9, wherein the estimation of the reflectance of the medium is performed for predetermined scanned lines.

11. The apparatus as set forth in 9, wherein the estimation of the reflectance of the medium is performed for randomly determined scanned lines.

12. An exposure control apparatus for a digital input device, the apparatus comprising:

means for collecting a histogram for a scanned line on a medium;

means for updating a cumulative histogram based upon the histogram collected for the scanned line; and means for using the histogram collected for the scanned line to estimate the reflectance of the medium;

wherein the histogram collected for the scanned line is used to estimate the reflectance of the medium indirectly by revising an estimation based upon the updated cumulative histogram and thereby align an estimated tone gamut of the medium to the dynamic range of the digital input device to generate a tone response curve during a single scan; and wherein the estimation of the reflectance of the medium includes determining an average tone value for a particular color channel within the cumulative histogram.

13. The apparatus as set forth in 12, wherein the estimation of the reflectance of the medium is performed for predetermined scanned lines.

14. The apparatus as set forth in 12, wherein the estimation of the reflectance of the medium is performed for randomly determined scanned lines.

15. The apparatus as set forth in 12, wherein the estimation of the reflectance of the medium includes determining an average tone deviation value for a particular color channel within the cumulative histogram.

16. The apparatus as set forth in 12, wherein the particular color is red.

* * * * *